(12) United States Patent
Nishibashi et al.

(10) Patent No.: US 9,341,489 B2
(45) Date of Patent: May 17, 2016

(54) NAVIGATION APPARATUS

(75) Inventors: Kumi Nishibashi, Tokyo (JP); Takashi Irie, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/399,123

(22) PCT Filed: May 29, 2012

(86) PCT No.: PCT/JP2012/063749
§ 371 (c)(1),
(2), (4) Date: Nov. 5, 2014

(87) PCT Pub. No.: WO2013/179385
PCT Pub. Date: Dec. 5, 2013

(65) Prior Publication Data
US 2015/0142304 A1 May 21, 2015

(51) Int. Cl.
*G08G 1/00* (2006.01)
*G01C 21/34* (2006.01)
*G01C 21/36* (2006.01)

(52) U.S. Cl.
CPC ............ *G01C 21/34* (2013.01); *G01C 21/3629* (2013.01); *G01C 21/3655* (2013.01)

(58) Field of Classification Search
None
See application file for complete search history.

(56) References Cited

U.S. PATENT DOCUMENTS

| 8,538,681 | B2 | 9/2013 | Arie | |
|---|---|---|---|---|
| 2002/0101166 | A1* | 8/2002 | Weindorf et al. | 315/82 |
| 2011/0184641 | A1* | 7/2011 | Arie | 701/201 |
| 2012/0303266 | A1* | 11/2012 | Su et al. | 701/420 |

FOREIGN PATENT DOCUMENTS

| JP | 2002-104016 A | 4/2002 |
|---|---|---|
| JP | 2002-286473 A | 10/2002 |
| JP | 2004-220574 A | 8/2004 |
| JP | 2006-12081 A | 1/2006 |
| JP | 2007-178209 A | 7/2007 |
| JP | 2008-20336 A | 1/2008 |
| JP | 2009-25071 A | 2/2009 |
| JP | 2010-19661 A | 1/2010 |
| JP | 2011-122849 A | 6/2011 |
| JP | 2011-154003 A | 8/2011 |
| JP | 2011-172407 A | 9/2011 |
| WO | WO 2008/001620 A1 | 1/2008 |

OTHER PUBLICATIONS

International Search Report issued in PCT/JP2012/063749, mailed on Aug. 8, 2012.

* cited by examiner

*Primary Examiner* — Thomas Tarcza
*Assistant Examiner* — Garrett Evans
(74) *Attorney, Agent, or Firm* — Birch, Stewart, Kolasch & Birch, LLP

(57) ABSTRACT

An object of the present invention is to perform continuous guidance in which guidance on a first guidance point which is a guidance point subsequent to a current position and guidance on a second guidance point which is a subsequent guidance point are continuously performed at one time in a navigation apparatus in more suitable circumstances. The navigation apparatus includes continuous a guidance determination part that determines whether or not to cause a display part and an audio guidance part serving as a guidance part to perform the continuous guidance on the first guidance point and the second guidance point based on a distance between the first guidance point and the second guidance point and current date and time acquired by a current date and time acquisition part.

9 Claims, 10 Drawing Sheets

NAVIGATION APPARATUS

TECHNICAL FIELD

The present invention relates to a navigation apparatus which performs route guidance, and more particularly to a technique of continuous guidance in which guidance is performed on a plurality of successive guidance points (points to be guided on) continuously at one time.

BACKGROUND ART

General navigation apparatuses installed in a vehicle or the like perform route guidance by means of screen displays and audio messages when the current position approaches a guidance point such as an intersection, and in the case where a distance between a guidance point subsequent to the current position (first guidance point) and the next guidance point (second guidance point) is short, the navigation apparatuses perform continuous guidance in which guidance is performed on these two guidance points continuously at one time, for example, "Turn right at the point ahead. XX meters from that point, turn left." With the continuous guidance, a user (driver) can drive unhurriedly even in making a left turn and a right turn in a short interval.

Conventionally, whether the navigation apparatus is to perform the continuous guidance or not has been determined based on a distance between the first guidance point and the second guidance point (hereinafter, referred to as "distance between guidance points"). That is, the conventional navigation apparatuses perform the continuous guidance if the distance between guidance points is equal to or less than a predetermined threshold, and perform usual guidance which only provides guidance on the first guidance point (hereinafter, referred to as "individual guidance") if the distance between guidance points is greater than the threshold.

For example, Patent Document 1 listed below proposes a technique of making determination of whether to perform the individual guidance or the continuous guidance by taking into account map information of roads between the first guidance point and the second guidance point (the numbers of lanes, road widths, altitude differences, paving conditions, and turning angles) and traffic information (traffic jam information). The technique adjusts ease of performing the continuous guidance by correcting, based on the map information and the traffic information, the distance between guidance points or the threshold which is to be used in the determination of whether or not to perform the continuous guidance.

The technique of Patent Document 1 facilitates smooth driving of the user by correcting the distance between guidance points to be shorter (or by correcting the threshold to be greater) so that the continuous guidance is easily performed in the case where, for example, the roads between the first guidance point and the second guidance point have many lanes and the user has to make several lane changes. On the other hand, the technique avoids redundant continuous guidance by correcting the distance between guidance points to be longer (or by correcting the threshold to be smaller) so that the continuous guidance is not easily performed in such a case where, for example, it takes a long time to travel from the first guidance point to the second guidance point due to a traffic jam.

PRIOR ART DOCUMENT

Patent Document

Patent Document 1: Japanese Patent Application Laid-Open No. 2010-019661

SUMMARY OF INVENTION

Problems to be Solved by the Invention

Patent Document 1 adjusts the ease of performing the continuous guidance based only on information which directly influences traveling of vehicles such as the map information (the numbers of lanes, road widths, altitude differences, paving conditions, and turning angles) and the traffic information (traffic jam information) of the roads. Although it is considered that the actual flow of traffic and the smoothness of driving the vehicle are also greatly influenced by factors such as the time period and the weather which do not directly relate to traveling of the vehicles, Patent Document 1 does not take into account these kinds of information.

The present invention has been made to solve the above-described problem, and an object thereof is to provide a navigation apparatus capable of performing the continuous guidance in more suitable circumstances.

Means for Solving the Problems

The navigation apparatus according to the present invention includes: a map information storage part that stores map data; a position detection part that detects a current position; a route search part that sets a route to a destination on the map data; a time acquisition part that acquires current time; a guidance part that performs guidance along the route set by the route search part before each guidance point on the route; and a continuous guidance determination part that determines, based on a distance between a first guidance point which is a guidance point subsequent to the current position and a second guidance point which is a guidance point subsequent to the first guidance point and the current time, whether to cause the guidance part to perform continuous guidance in which guidance on the first guidance point and guidance on the second guidance point are continuously performed at one time.

Effects of the Invention

According to the present invention, the ease of performing the continuous guidance can be changed for each time period, and thus, the continuous guidance suitable for the time period can be performed. For example, while the continuous guidance is actively performed to help user's smooth driving during the heavy traffic hours such as rush hours and the hours of poor visibility such as the night-time, redundant continuous guidance is prevented during the other hours by performing the continuous guidance at a usual frequency.

The object, features, aspects, and advantages of the present invention will become more apparent from the following detailed description and the accompanying drawings.

DESCRIPTION OF EMBODIMENTS

<First Embodiment>

In the following embodiment, it is assumed that a navigation apparatus is installed in a vehicle and has a function of performing continuous guidance in which guidance on a guidance point subsequent to the current position of the own vehicle (first guidance point) and on a subsequent guidance point (second guidance point) are continuously performed at one time.

The navigation apparatus according to the first embodiment is configured to determine whether or not to perform the continuous guidance by taking into account not only a distance between the first guidance point and the second guidance point (distance between guidance points) but also the current time.

For example, the flow of traffic (degree of congestion) changes according to the time periods, for example, the amount of traffic increases during the morning and evening rush hours but the amount of traffic decreases late at night. Since it is difficult for a driver to change lanes in heavy traffic, it is highly required to previously provide the driver with guidance on the guidance point that is two points ahead (an intersection and the like) by the continuous guidance. In contrast, since the driver can easily change lanes in little traffic, necessity of the continuous guidance is relatively low and the driver may feel that the continuous guidance is rather redundant. Thus, in this embodiment, the continuous guidance is easily performed during the heavy traffic hours, and the continuous guidance is not easily performed during the little traffic hours.

Figure 1:
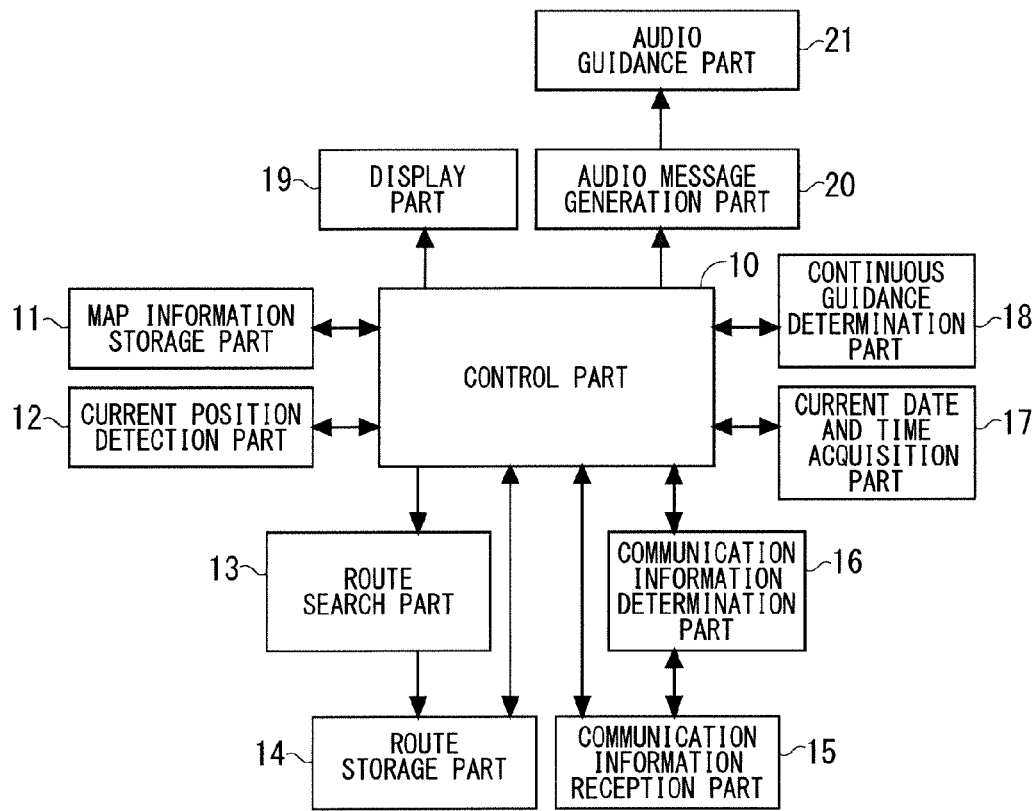
FIG. 1 is a block diagram illustrating a functional configuration of a navigation apparatus according to an embodiment of the present invention.

FIG. 1 is a block diagram illustrating a functional configuration of the navigation apparatus according to the embodiment of the present invention. The navigation apparatus includes respective function blocks of a control part 10, a map information storage part 11, a current position detection part 12, a route search part 13, a route storage part 14, a communication information reception part 15, a communication information determination part 16, a current date and time acquisition part 17, a continuous guidance determination part 18, a display part 19, an audio message generation part 20, and an audio guidance part 21, to be described below.

The control part 10 controls the whole navigation apparatus by performing respective mathematical operations required for operation of the navigation apparatus and by performing motion control on the respective function blocks. The map information storage part 11 stores digitized map data including data of "node" representing a site on a map and data of "link" representing a road connecting the respective nodes.

The current position detection part 12 detects the current position of a moving object (herein, a vehicle) equipped with the navigation apparatus. The route search part 13 searches for and sets a route between two sites in the map data stored in the map information storage part 11, and mainly sets a route from the current position to a user-set destination. The route storage part 14 stores the route set by the route search part 13. The navigation apparatus operates to perform guidance along the route stored in the route storage part 14.

The communication information reception part 15 acquires respective types of information sent from outside, and for example, may be configured by general purpose communications equipment such as a mobile phone or a smart phone, or may be configured by dedicated communications equipment intended to acquire traffic information such as a TMC (Traffic Message Channel) receiver or a VICS (Vehicle Information and Communications System) (registered trademark) receiver. The communication information determination part 16 analyzes the contents of the information received by the communication information reception part 15 to determine the information. The information acquired by the communication information reception part 15 is sent to the control part 10 via the communication information determination part 16.

The current date and time acquisition part 17 acquires the current date and the time (hereinafter, referred to as "current date and time"). The continuous guidance determination part 18 determines whether or not the navigation apparatus performs the continuous guidance. The determination is performed based on the information of the map data stored in the map information storage part 11, the current date and time acquired by the current date and time acquisition part 17, and the information from the communication information determination part 16 (the contents of the information acquired by the communication information reception part 15).

The display part 19 displays a map represented by the map data stored in the map information storage part 11 and a route to a destination stored in the route storage part 14. When guidance is performed at each guidance point, the navigation apparatus causes the display part 19 to display the contents by an icon and the like. The audio message generation part 20 generates data for audio messages corresponding to the contents of the guidance when the navigation apparatus performs the guidance. The audio guidance part 21 performs audio guidance by outputting the audio based on the data of audio messages generated by the audio message generation part 20. As described above, the display part 19, the audio message generation part 20, and the audio guidance part 21 serve as a guidance part that provides guidance for the user (driver).

Figure 2:
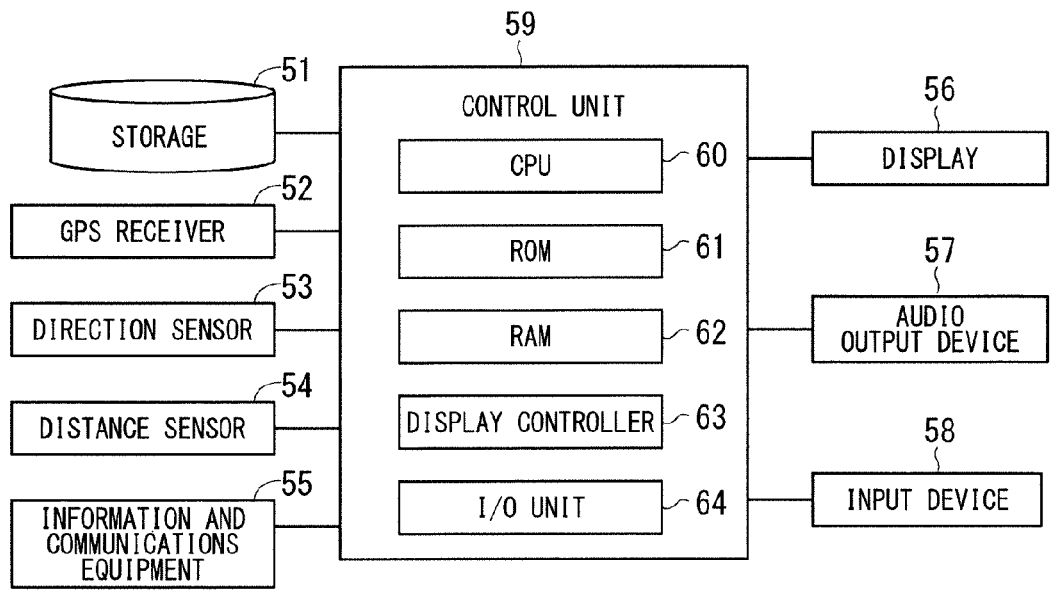
FIG. 2 is a block diagram illustrating a hardware configuration of the navigation apparatus.

FIG. 2 is a block diagram illustrating a hardware configuration of the navigation apparatus illustrated in FIG. 1. A storage 51 stores and reads out the digitized map data, and serves as the map information storage part 11 of FIG. 1.

A GPS receiver 52 detects the current position of the moving object (vehicle) equipped with the navigation apparatus based on radio waves from satellites, a direction sensor 53 detects a direction of the moving object, and a distance sensor 54 detects a moving distance of the moving object. These GPS receiver 52, direction sensor 53, and distance sensor 54 serve as the current position detection part 12 of FIG. 1.

Information and communications equipment 55 is communications equipment such as a mobile phone or a smart phone or a TMC or VICS receiver and serves as the communication information reception part 15 of FIG. 1. A display 56 displays the map information, a route to a destination, and the contents of the guidance, and is configured by a liquid crystal display or the like, for example. The display 56 serves as the display part 19 of FIG. 1. An audio output device 57 is a device for outputting audio such as a speaker, and serves as the audio guidance part 21 of FIG. 1. An input device 58 is for the user to operate the navigation apparatus and may be, for example, a touch panel provided on the display 56.

A control unit 59 performs the overall control and the respective mathematical operations of the navigation apparatus, and corresponds to the control part 10 of FIG. 1. The control unit 59 includes a CPU (Central Processing Unit) 60, a ROM (Read Only Memory) 61, a RAM (Random Access Memory) 62, a display controller 63, and an I/O (Input/Output) unit 64, to be described below.

The CPU 60 executes programs that perform a route search, guidance point extraction, and determination of whether or not to perform the continuous guidance, and performs calculations involved in the execution of the programs. The ROM 61 is a memory that stores a program constant and the like to be used by the CPU 60 in the process of operation. The RAM 62 is a memory where the program and the map data are loaded by the CPU 60 in the processing and where the operation result is written. The display controller 63 controls a screen display of the display 56, and the I/O unit 64 is an interface between the control unit 59 and the respective external devices 51 to 58. Note that, the route search part 13, the route storage part. 14, the communication information determination part 16, the current date and time acquisition part 17, the continuous guidance determination part 18, the audio message generation part 20, and the like of FIG. 1 are implemented by the processing operation of the control unit 59.

Figure 3:
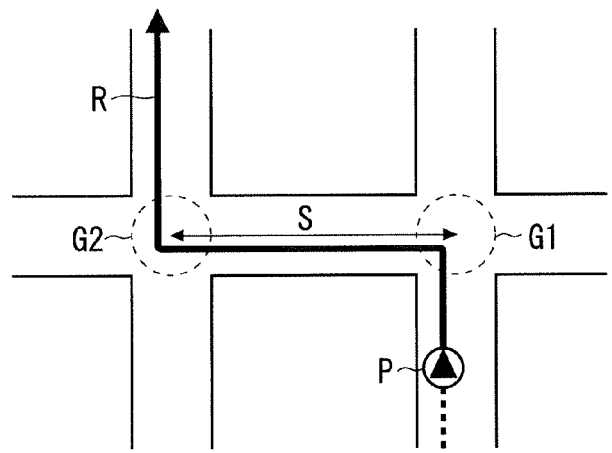
FIG. 3 is a diagram for describing continuous guidance.

Now, the continuous guidance will be specifically described. For example, as in FIG. 3, a case is assumed where two guidance points G1 and G2 are successively present in a route R to a destination guided by the navigation apparatus ahead (in the direction of travel) of a current position P of the own vehicle. In the example of FIG. 3, the navigation apparatus is to guide the user to turn left at the first guidance point G1 that the vehicle will pass first and to turn right at the subsequent second guidance point G2, but in the case where a distance between the first guidance point G1 and the second guidance point G2 (distance between guidance points) S is short, when a current position P approaches the first guidance point G1, the navigation apparatus performs the continuous guidance in which guidance on the first guidance point G1 and guidance on the second guidance point G2 are performed at one time, such as "Turn left at the point ahead. S meters from that point, turn right."

The conventional navigation apparatus is configured to perform the continuous guidance if the distance between guidance points S is equal to or less than a certain threshold. The above-described navigation apparatus of Patent Document 1 also performs the continuous guidance if the distance between guidance points S is equal to or less than a threshold, but the navigation apparatus determines whether or not to perform the continuous guidance by taking into account not only the distance between guidance points S but also the map information between the first guidance point G1 and the second guidance point G2 (the numbers of lanes, road widths, altitude differences, paving conditions, and turning angles) and the traffic information (traffic jam information).

On the other hand, the navigation apparatus according to this embodiment determines whether or not to perform the continuous guidance by taking into account the distance between guidance points S and the current date and time. Operation of the navigation apparatus according to this embodiment will be described below.

Figure 4:
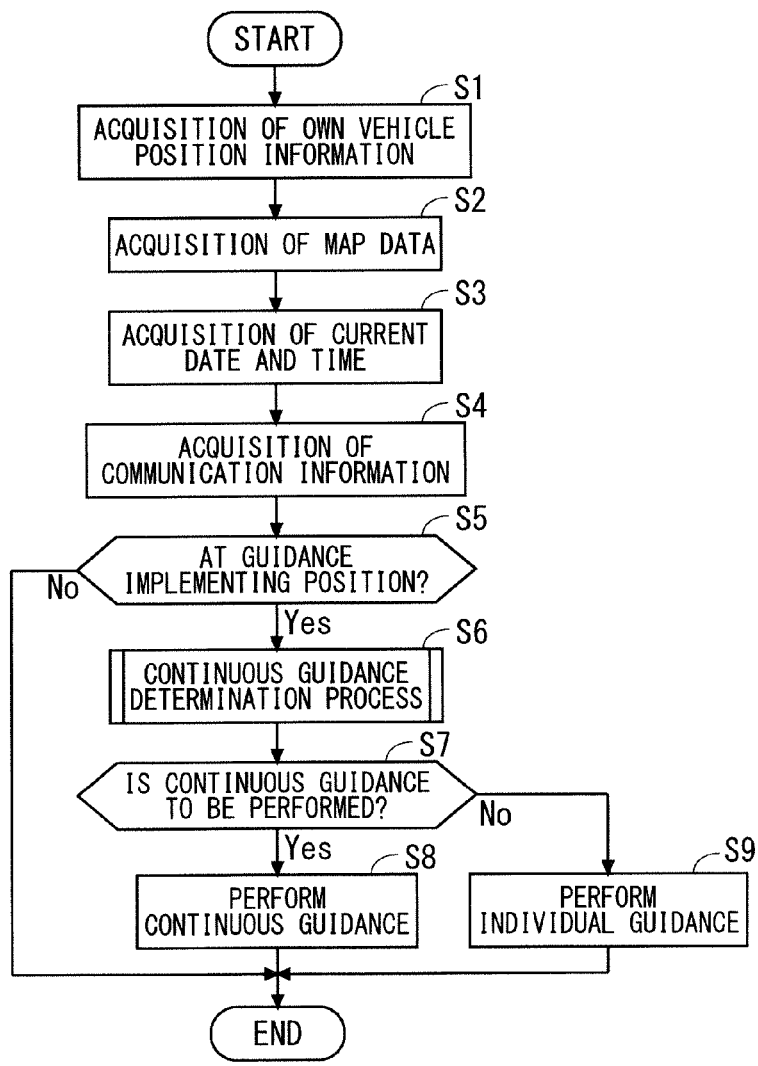
FIG. 4 is a flowchart showing operation of a navigation apparatus according to the embodiment of the present invention.

FIG. 4 is a flowchart showing operation of the navigation apparatus according to the embodiment of the present invention. The flow of FIG. 4 is repeatedly performed after route guidance by the navigation apparatus is started, and it is assumed that destination setting by the user and route setting by the route search part 13 has been completed and the set route is already stored in the route storage part 14.

When the route guidance by the navigation apparatus is started, the control part 10 acquires the current position of the own vehicle (own vehicle position information) detected by the current position detection part 12 (step S1), and acquires necessary map data from the map information storage part 11 according to the current position (step S2). Further, the control part 10 acquires the current date and time by using the current date and time acquisition part 17 (step S3), and acquires predetermined communication information (for example, traffic information such as traffic jam information) by using the communication information reception part 15 (step S4).

Then, it is determined whether the current position of the own vehicle acquired from the current position detection part 12 is at a guidance implementing position (i.e., is approaching the guidance point) (step S5). If the own vehicle is not at the guidance implementing position (No in step S5), the flow of FIG. 4 ends.

If the own vehicle is at the guidance implementing position (Yes in step S5), the navigation apparatus implements the guidance for the user, but prior to the implementation, a determination process (continuous guidance determination process) on whether or not the guidance is performed as the continuous guidance is performed by the continuous guidance determination part 18 (step S6).

If the continuous guidance determination part 18 has determined to perform the continuous guidance (Yes in step S7), the control part 10 performs guidance on a guidance point subsequent to the current position (first guidance point) and guidance on a subsequent guidance point (second guidance point) continuously at one time by using the display part 19 and the audio guidance part 21 serving as the guidance part (step S8). In contrast, if the continuous guidance determination part 18 has determined not to perform the continuous guidance (No in step S7), the control part 10 implements individual guidance which provides only the guidance on the guidance point subsequent to the current position (first guidance point) by using the display part 19 and the audio guidance part 21 (step S9). In both of the continuous guidance and the individual guidance, a guidance method may be a combination of audio guidance by the audio guidance part 21 and visual guidance which displays, for example, an arrow icon representing right turn or left turn on the display part 19.

Figure 5:
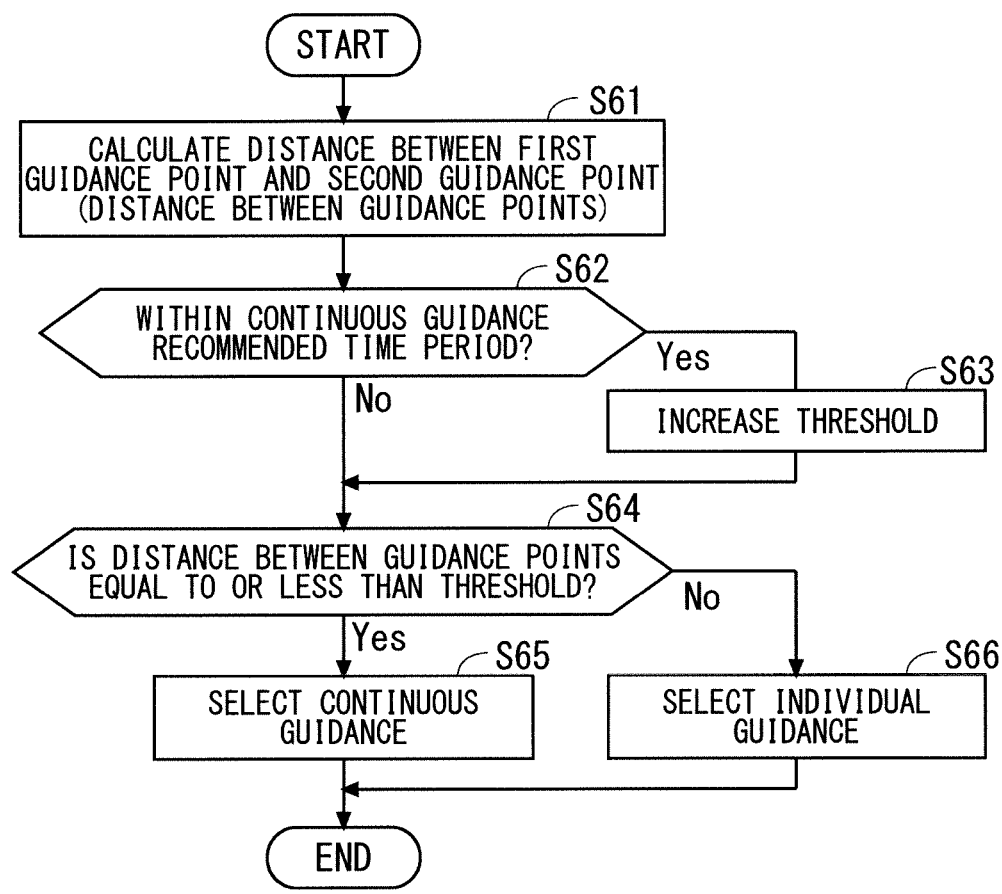
FIG. 5 is a flowchart of a continuous guidance determination process in a first embodiment.

Now, the continuous guidance determination process in step S6 will be specifically described. FIG. 5 is a flow chart showing an example of the process.

In the continuous guidance determination process, firstly, the distance between guidance points which is a distance between the first guidance point and the second guidance point is calculated (step S61). Next, whether the current date and time is within a predetermined time period for which the continuous guidance is recommended (continuous guidance recommended time period) is confirmed (step S62).

The continuous guidance recommended time period is defined by taking into account the quantity of the traffic or the quality of the visibility. For example, when the quantity of the traffic is taken into account, implementation of the continuous guidance is recommended (Yes is selected in step S62) during the morning hours (for example, 7 o'clock to 9 o'clock) and the evening hours (for example, 17 o'clock to 19 o'clock) corresponding to so-called rush hours since the amount of traffic is larger than during the daytime and it is difficult to change the lanes. On the other hand, when the quality of the visibility is taken into account to define the continuous guidance recommended time period, implementation of the continuous guidance is recommended from the evening to the next morning, i.e., the night hours (for example, 18 o'clock to 6 o'clock) since the visibility is poorer than during the daytime.

If the current date and time is not included in the continuous guidance recommended time period (No in step S62), the distance between guidance points obtained in step S61 is compared with a predetermined threshold (step S64). If the distance between guidance points is equal to or less than the threshold, Yes is selected in step S64, and the continuous guidance is selected (step S65), and if not, No is selected in step S64, and the individual guidance is selected (step S66).

On the other hand, if the current date and time is included in the continuous guidance recommended time period (Yes in step S62), the above threshold is corrected to be greater (step S63), and then, the distance between guidance points is compared with the corrected threshold (step S64). Also in this case, if the distance between guidance points is equal to or less than the threshold, the continuous guidance is selected (step S65), and if not, the individual guidance is selected (step S66).

When the threshold is corrected to be greater in step S63, the continuous guidance will be selected even when the distance between guidance points is long. That is, the correction for making the threshold greater means causing the continuous guidance to be easily performed.

As described above, in the navigation apparatus of this embodiment, the continuous guidance is easily performed when the current time is within the continuous guidance recommended time period. Therefore, even in the morning and evening heavy traffic hours or in the night hours of poor visibility, since the navigation apparatus actively performs the continuous guidance, it can help user's smooth driving. On the other hand, since the continuous guidance is performed at usual frequency during the time periods other than the continuous guidance recommended time period, the continuous guidance is prevented from being implemented more than necessary and the continuous guidance which the user feels redundant can be suppressed.

Here, the continuous guidance recommended time period during which the continuous guidance is easily performed need not to be in a fixed range. For example, when the quantity of the traffic is taken into account to define the continuous guidance recommended time period, whether Daylight-Saving Time is adopted or not may be determined from the date information and the ranges of the morning hours and the evening hours (rush hours) may be changed in accordance therewith. Further, since the hours with the increased traffic differ between the business days and nonbusiness days, each range of the morning hours and the evening hours may be changed in accordance with whether it is a business day or a nonbusiness day.

In addition, when the quality of the visibility is taken into account to define the continuous guidance recommended time period, the range of the night hours may be changed in accordance with the season determined from the date information. For example, a year may be divided into four seasons of spring, summer, autumn, and winter, and the range of the night hours may be changed in accordance with the four seasons. Each of the four seasons may be defined on a monthly basis such as March to May as the spring, June to August as the summer, September to November as the autumn, and December to February as the winter. Moreover, the three months period around the vernal equinox may be defined as the spring, the three months period around the summer solstice may be defined as the summer, the three months period around the autumnal equinox may be defined as the autumn, and the three months period around the winter solstice may be defined as the winter. Alternatively, sunrise and sunset may be determined from the date information, and from the sunset to the next sunrise may be defined as the night hours. Information about the sunrise time and the sunset time may be previously stored in the navigation apparatus, or may be acquired by the communication information reception part 15 from outside in step S4 of FIG. 4.

Although the continuous guidance determination process shown in FIG. 5 corrects the threshold among the distance between guidance points and the threshold compared with the distance, the correction may be made on the distance between guidance points. That is, the continuous guidance is also easily performed by the correction to decrease the distance between guidance points instead of the correction to increase the threshold in step S63. Alternatively, both of the distance between guidance points and the threshold may be corrected.

Further, the amount of correction of the threshold (or the distance between guidance points) in the continuous guidance determination process may be changed in accordance with the time period. For example, since the visibility is poor in the twilight such as at dawn and in the evening as compared to the daytime but not as poor as in the night-time, the amount of correction may be smaller in the twilight than in the night-time. That is, the configuration may be such that the continuous guidance is more easily performed in the twilight than during the daytime and not easily performed than in the night-time.

Although the continuous guidance is easily performed in the heavy traffic hours in the description above, the flow of traffic may become very slow in some places due to a traffic jam as the traffic increases. If the continuous guidance is performed at the time of such a traffic jam, the guidance becomes rather redundant. Then, in the case where such places can be previously specified, the correction to decrease the threshold (or the correction to increase the distance between guidance points) may be made for the heavy traffic hours only for such places, so that the continuous guidance is not easily performed.

Although the exact current time is acquired from the current time acquired by the current date and time acquisition part 17 in this embodiment, approximate determination of whether it is the night hours (the time period from the evening to the next morning) can also be made from ambient brightness. Therefore, the configuration may be such that, for example, a detection result from an illuminance sensor for automatic lighting of headlights of the vehicle is used in the determination of whether or not to perform the continuous guidance. That is, the configuration may be such that the control part 10 monitors the detection result from the illuminance sensor, and determines that it is the night hours when light is not detected by the illuminance sensor, and corrects the threshold (or the distance between guidance points) so that the continuous guidance is easily performed.

Further, even if the vehicle is not equipped with the illuminance sensor, the user lights the headlights in traveling during the night-time, and thus, the determination of whether it is the night hours can also be made from a usage state of the headlights. Therefore, the configuration may be such that the control part 10 monitors the usage state of the headlights, and determines that it is the night hours when the headlights are lit, so that the continuous guidance is easily performed.

<Second Embodiment>

Although the determination of whether or not to cause the continuous guidance to be easily performed (whether or not to correct the threshold) is made based on the current date and time acquired by the current date and time acquisition part 17 in the first embodiment, the determination may be made by adding much more kinds of information such as road attribute information included in the map data stored in the map information storage part 11 and the traffic information acquired by the communication information reception part 15 to the consideration. The second embodiment proposes a navigation apparatus which determines whether or not to perform the continuous guidance by taking into account these kinds of information in addition to the distance between guidance points and the current date and time.

For example, since the road is likely to be jammed with vehicles in an area around the entrance to an expressway or an area before a place where the number of lanes decreases, it is preferable to actively perform the continuous guidance there. Therefore, in the continuous guidance determination process, it is preferable not only to take into account the distance between guidance points and the current date and time but also to determine whether any of the first guidance point, the second guidance point, and a route between the first guidance point and the second guidance point (hereinafter, referred to as "an area around the first guidance point and the second guidance point") is a place which is likely to be jammed with vehicles, and when it is determined as such, the continuous guidance may be easily performed.

A place which is likely to be jammed with vehicles can be specified based on the road attribute information including, for example, the width, the shape, the slope, the number of lanes, and presence or absence of a traffic signal of the road, the road type (the type such as the prefectural road or the national road or the type such as the ordinary road or the expressway), the type(s) and the number of road(s) which intersects (is connected with) the guided road, and whether the place is in an urban area or in a suburb. As a result, whether or not the area around the first guidance point and the second guidance point is a place which is likely to be jammed with vehicles can be determined by the road attribute information of the area around the first guidance point and the second guidance point.

Further, in the case where the road between the first guidance point and the second guidance point has many lanes and several lane changes are required, it is also preferable to actively perform the continuous guidance. Therefore, in the continuous guidance determination process, it is preferable to determine the number of lanes from the road attribute between the first guidance point and the second guidance point, so that the continuous guidance is more easily performed as the number of lanes increases.

Further, in the case where the communication information reception part 15 can acquire the traffic information including information about a traffic jam section (traffic jam information), information about a construction section, and information about an accident scene from the TMC or the VICS, these types of information may be added to the factor for the determination of whether or not to perform the continuous guidance. For example, in the case where the area around the first guidance point and the second guidance point is contained in a traffic jam section, the site must be jammed with vehicles, and therefore, it is preferable to actively perform the continuous guidance. Further, also in the case where the area around the first guidance point and the second guidance point is before a construction section or before a traffic jam section, the area is likely to be jammed with vehicles, and therefore, it is preferable to actively perform the continuous guidance.

A configuration and basic operation of the navigation apparatus according to the second embodiment may be the same as those of the first embodiment (FIG. 1, FIG. 2, and FIG. 4). Therefore, only the continuous guidance determination process according to the second embodiment (corresponding to step S6 of FIG. 4) will be described below.

Figure 6:
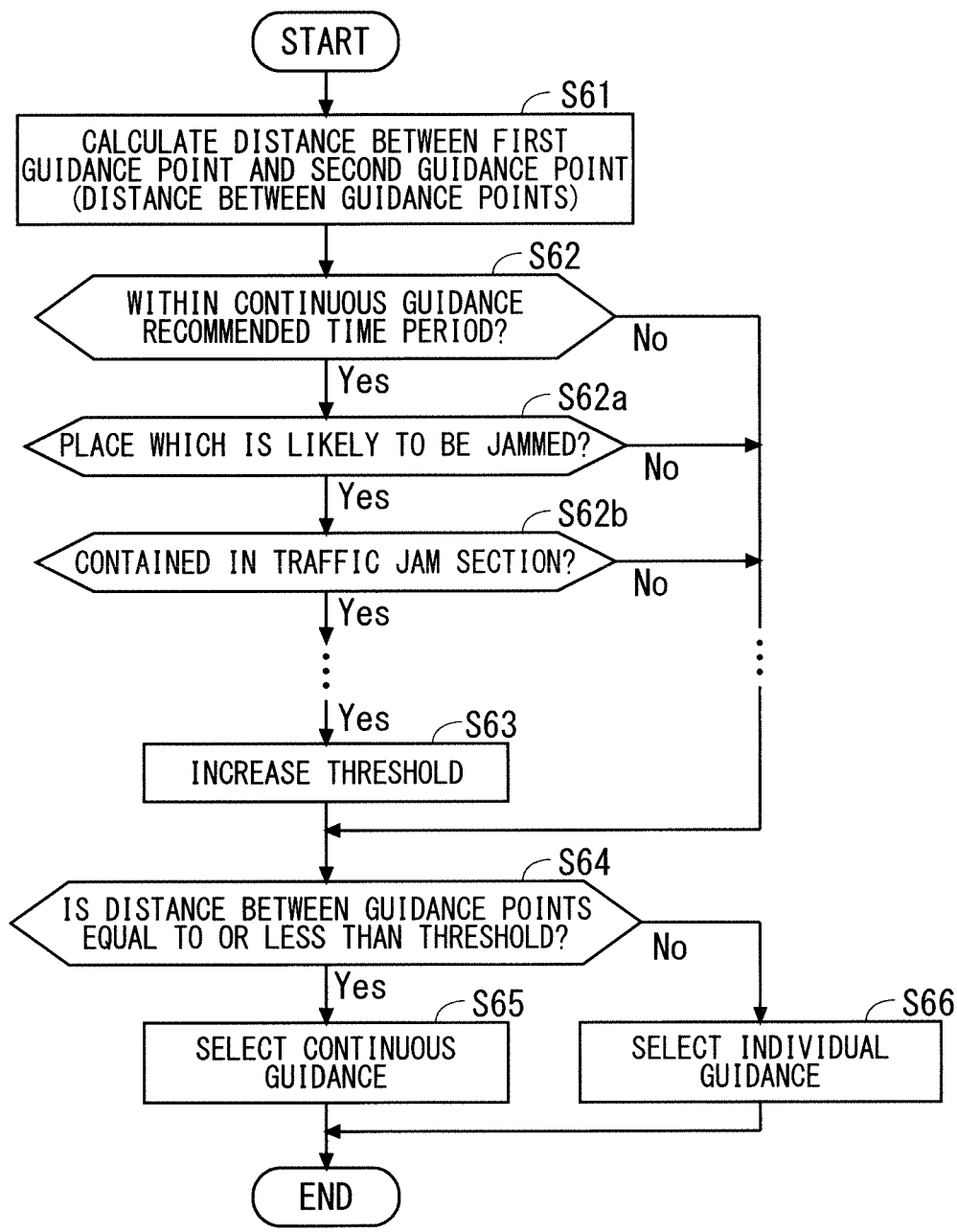
FIG. 6 is a flowchart of a continuous guidance determination process in a second embodiment.

FIG. 6 is a flowchart showing an example of the continuous guidance determination process according to the second embodiment. In the figure, the same steps as those shown in FIG. 5 are denoted by the same reference numerals.

In the continuous guidance determination process of this embodiment, the distance between guidance points which is a distance between the first guidance point and the second guidance point is calculated (step S61), and then, a plurality of items which influence a necessity for the continuous guidance including whether or not the current date and time is within the continuous guidance recommended time period (step S62), whether or not the area around the first guidance point and the second guidance point is a place which is likely to be jammed with vehicles (step S62a), and whether or not the area around the first guidance point and the second guidance point is contained in a traffic jam section (step S62b) are determined.

If any of the items is not satisfied (No is selected in any of steps S62a and S62b), the distance between guidance points obtained in step S61 is compared with the predetermined threshold (step S64). If the distance between guidance points is equal to or less than the threshold, the continuous guidance is selected (step S65), and if not, the individual guidance is selected (step S66).

On the other hand, if all of the items are satisfied (Yes is selected in all of steps S62a and S62b), the threshold is corrected to be greater (or the distance between guidance points is corrected to be shorter) so that the continuous guidance is easily performed (step S63), and then, the distance between guidance points is compared with the corrected threshold (step S64). Also in this case, if the distance between guidance points is equal to or less than the threshold, the continuous guidance is selected (step S65), and if not, the individual guidance is selected (step S66).

According to this embodiment, more detailed setting as to whether or not to perform the continuous guidance is available than in the first embodiment.

Figure 7:
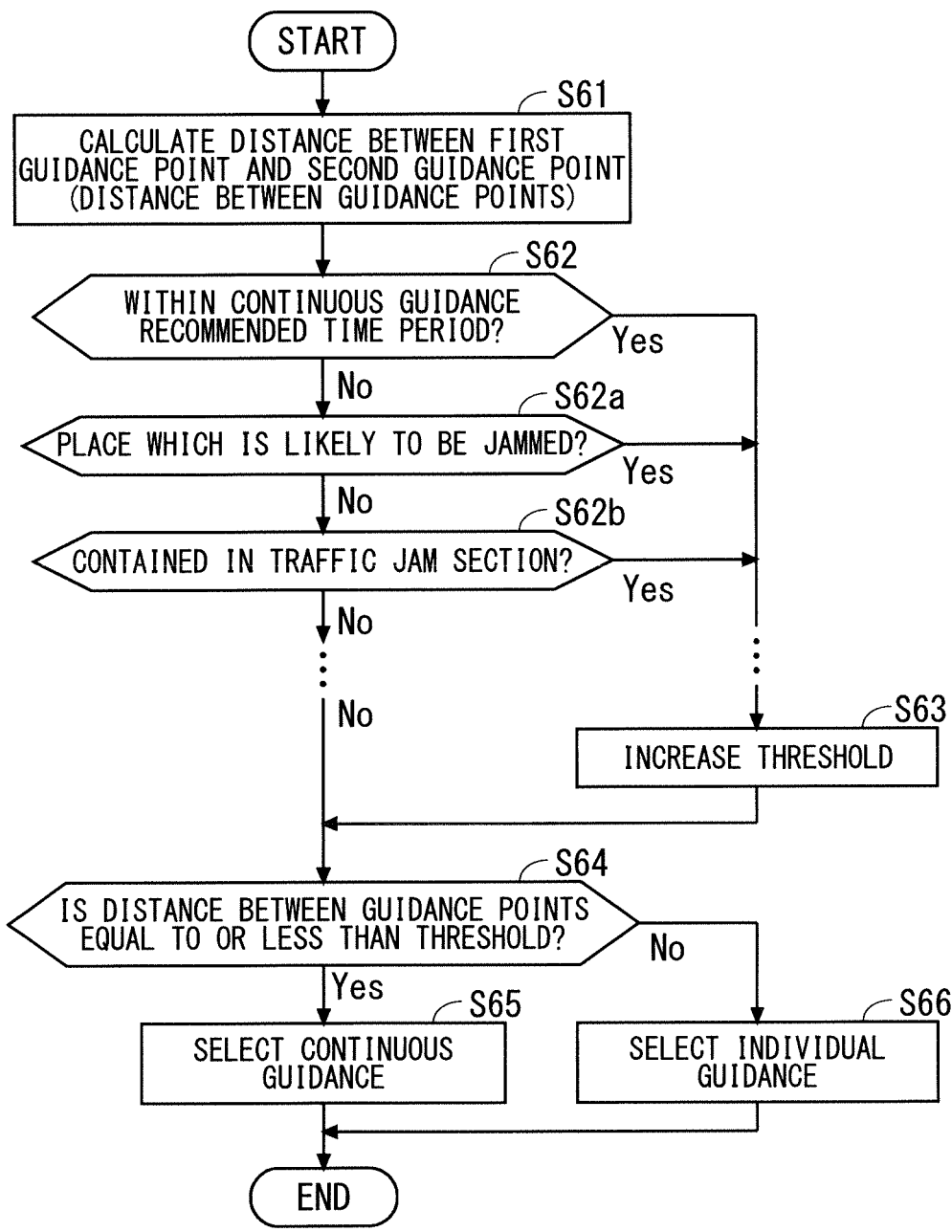
FIG. 7 is a flowchart of a modification of the continuous guidance determination process in the second embodiment.

Although FIG. 6 shows an example where the continuous guidance is caused to be easily performed if all of the plurality of items which influence a necessity for the continuous guidance are satisfied (where so-called "AND conditions" are met), it is possible to cause the continuous guidance to be easily performed if any one of the items is satisfied (where so-called "OR condition" is met) as in the flowchart of FIG. 7. The case of FIG. 6 has a higher effect in reducing redundant continuous guidance, and the case of FIG. 7 has a higher effect in helping smooth driving by the continuous guidance.

<Third Embodiment>

The third embodiment proposes a navigation apparatus which determines whether or not to perform the continuous guidance based on the distance between guidance points and the weather information. That is, in the continuous guidance determination process performed by the navigation apparatus, the determination of whether or not to cause the continuous guidance to be easily performed (whether or not to correct the threshold or the distance between guidance points) is performed based on the distance between guidance points and the weather information. For example, since the visibility is poorer in such weather as cloudy weather, rainy weather, foggy weather, or snowy weather than in good weather, it is preferable to actively perform the continuous guidance as in the case of the night-time.

A configuration and basic operation of the navigation apparatus according to the third embodiment may be the same as those of the first embodiment (FIG. 1, FIG. 2, and FIG. 4). Therefore, only the continuous guidance determination process according to the third embodiment (corresponding to step S6 of FIG. 4) will be described here. Note that, the latest weather information around the current position is acquired by the communication information reception part 15 in step S4 of FIG. 4.

Figure 8:
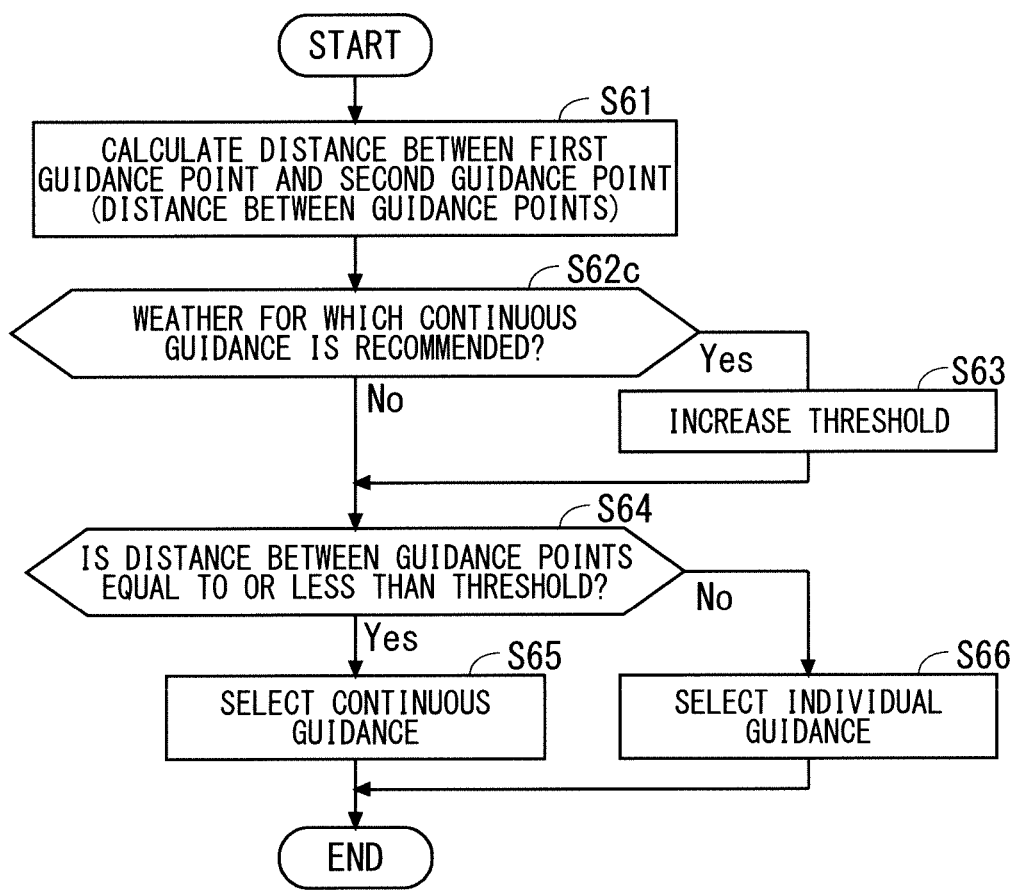
FIG. 8 is a flowchart of a continuous guidance determination process in a third embodiment.

FIG. 8 is a flowchart showing an example of the continuous guidance determination process according to the third embodiment. In the figure, the same steps as those shown in FIG. 5 are denoted by the same reference numerals.

In the continuous guidance determination process of this embodiment, the distance between guidance points which is a distance between the first guidance point and the second guidance point is calculated (step S61), and then, determination of whether or not the current weather around the area is the weather for which the continuous guidance is recommended is made (step S62c). The weather for which the continuous guidance is recommended is weather which makes visibility poorer such as cloudy weather, rainy weather, foggy weather, or snowy weather (bad weather) than in good weather.

If it is not bad weather (No in step S62c), the distance between guidance points obtained in step S61 is compared with the predetermined threshold (step S64). If the distance between guidance points is equal to or less than the threshold, the continuous guidance is selected (step S65), and if not, the individual guidance is selected (step S66).

On the other hand, if it is bad weather (Yes in step S62c), the threshold is corrected to be greater (or the distance between guidance points is corrected to be shorter) so that the continuous guidance is easily performed (step S63), and then, the distance between guidance points is compared with the corrected threshold (step S64). Also in this case, if the distance between guidance points is equal to or less than the threshold, the continuous guidance is selected (step S65), and if not, the individual guidance is selected (step S66).

In the navigation apparatus of this embodiment, the continuous guidance is easily performed in bad weather. Therefore, even in poor visibility under the influence of rain or fog, since the navigation apparatus actively performs the continuous guidance, it can help user's smooth driving. On the other hand, since the navigation apparatus performs the continuous guidance at a usual frequency in good weather, the continuous guidance is prevented from being implemented more than necessary and the continuous guidance which the user feels redundant can be suppressed.

The amount of correction of the threshold (or the distance between guidance points) in the continuous guidance determination process may be changed in accordance with the degree of bad weather (poorness of visibility). For example, the amount of correction may be increased much more in weather which makes visibility extremely poor such as dense foggy weather, heavy rainy weather, stormy weather, and snowy weather than in ordinary foggy or rainy weather, to further cause the continuous guidance to be easily performed. The degree of bad weather can be determined by using the weather information acquired by the communication information reception part 15 if it includes information about the degree of rain, snow, or fog, but the determination can be made from information of an issued warning or advisory of heavy rain, dense fog, or snow, for example.

The weather information which is to be the factor for the determination of whether or not to perform the continuous guidance is preferably the current (real-time) weather information, however, since sudden change in the weather rarely occurs, a certain amount of time lag is allowable. Alternatively, the weather information may be information expected based on the weather forecast.

Note that, although the configuration and basic operation of the navigation apparatus according to the third embodiment may be the same as those of the first embodiment (FIG. 1, FIG. 2, and FIG. 4) as described above, the current date and time acquisition part 17 of FIG. 1 and step S3 of FIG. 4 may be eliminated if the information of the current date and time is unnecessary.

Although this embodiment is configured to acquire the weather information by means of communication performed by the communication information reception part 15, the determination of whether it is raining can also be made, for example, based on a detection result from a rain sensor for automatic operation of windshield wipers of the vehicle, and thus, the detection result may be used as the weather information. That is, the configuration may be such that the control part 10 monitors the detection result from the rain sensor, and corrects the threshold (or the distance between guidance points) when the rain is detected, so that the continuous guidance is easily performed.

Further, even if the vehicle is not equipped with the rain sensor, since the user operates the windshield wipers while traveling in the rain, the determination of whether or not it is raining can also be made from a usage state of the windshield wipers. Therefore, the configuration may be such that the control part 10 monitors the usage state of the windshield wipers, and determines that it is bad weather when the windshield wipers are operating, so that the continuous guidance is easily performed.

<Fourth Embodiment>

In the fourth embodiment, the second embodiment is applied to the above-described third embodiment. That is, this embodiment proposes a navigation apparatus which determines whether or not to perform the continuous guidance by taking into account the road attribute information and the traffic information in addition to the distance between guidance points and the weather information.

A configuration and basic operation of the navigation apparatus according to the fourth embodiment may be the same as those of the first embodiment (FIG. 1, FIG. 2, and FIG. 4). Therefore, only the continuous guidance determination process according to the fourth embodiment (corresponding to step S6 of FIG. 4) will be described here.

Figure 9:
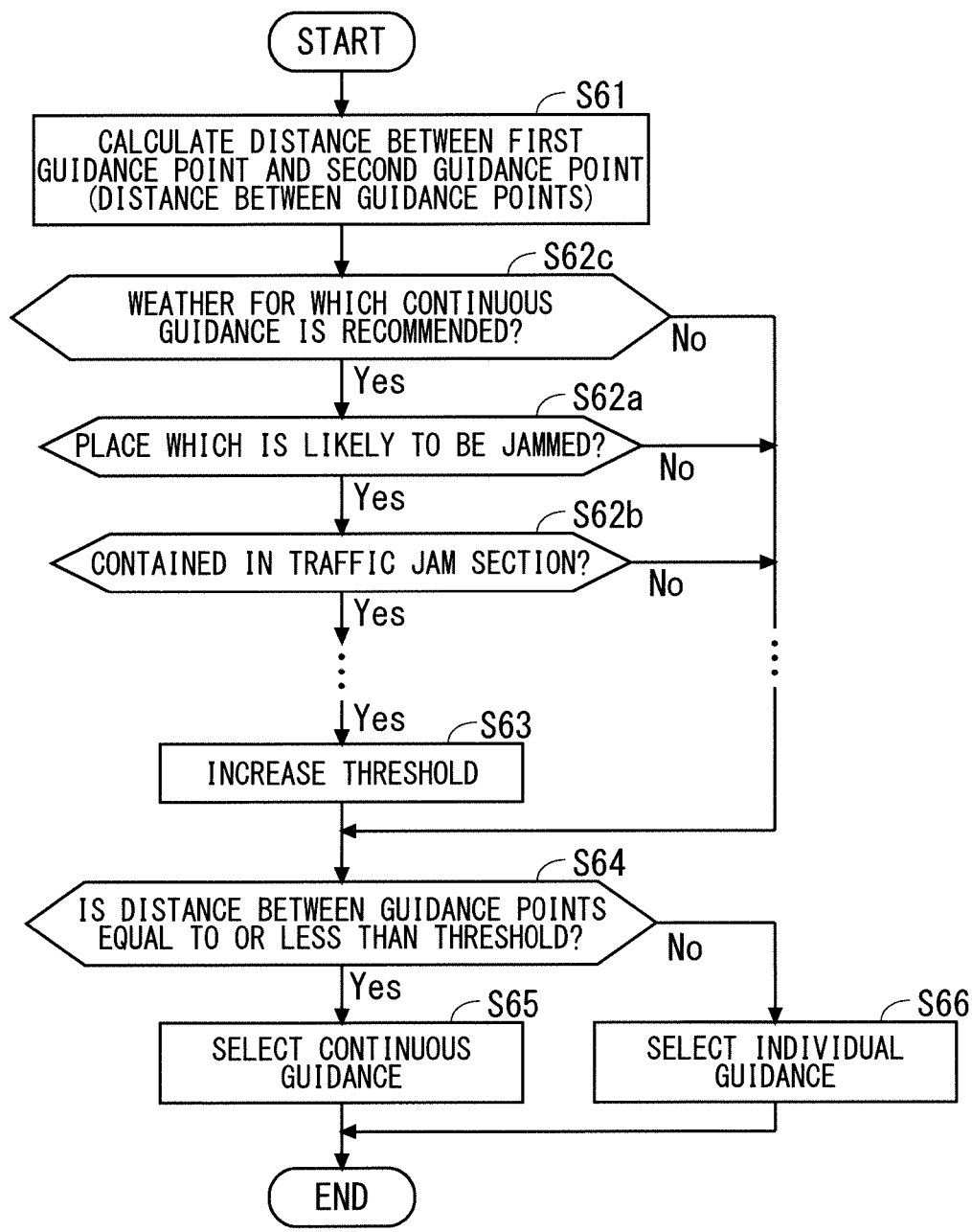
FIG. 9 is a flowchart of a continuous guidance determination process in a fourth embodiment.

FIG. 9 is a flowchart showing an example of the continuous guidance determination process according to the fourth embodiment. In the figure, the same steps as those shown in FIG. 8 are denoted by the same reference numerals.

In the continuous guidance determination process of this embodiment, the distance between guidance points which is a distance between the first guidance point and the second guidance point is calculated (step S61), and then, a plurality of items which influence a necessity for the continuous guidance including whether or not the current weather is the weather for which the continuous guidance is recommended (bad weather) (step S62c), whether or not the area around the first guidance point and the second guidance point is a place which is likely to be jammed with vehicles (step S62a), and whether or not the area around the first guidance point and the second guidance point is contained in a traffic jam section (step S62b) are determined.

If any of these items is not satisfied (No is selected in any of steps S62c, S62a, and S62b), the distance between guidance points obtained in step S61 is compared with the predetermined threshold (step S64). If the distance between guidance points is equal to or less than the threshold, the continuous guidance is selected (step S65), and if not, the individual guidance is selected (step S66).

On the other hand, if all of the items are satisfied (Yes is selected in all of steps S62c, S62a, and S62b), the threshold is corrected to be greater (or the distance between guidance points is corrected to be shorter) so that the continuous guidance (step S63) is easily performed, and then, the distance between guidance points is compared with the corrected threshold (step S64). Also in this case, if the distance between guidance points is equal to or less than the threshold, the continuous guidance is selected (step S65), and if not, the individual guidance is selected (step S66).

According to this embodiment, more detailed setting for determining whether or not to perform the continuous guidance is available than in the third embodiment.

Figure 10:
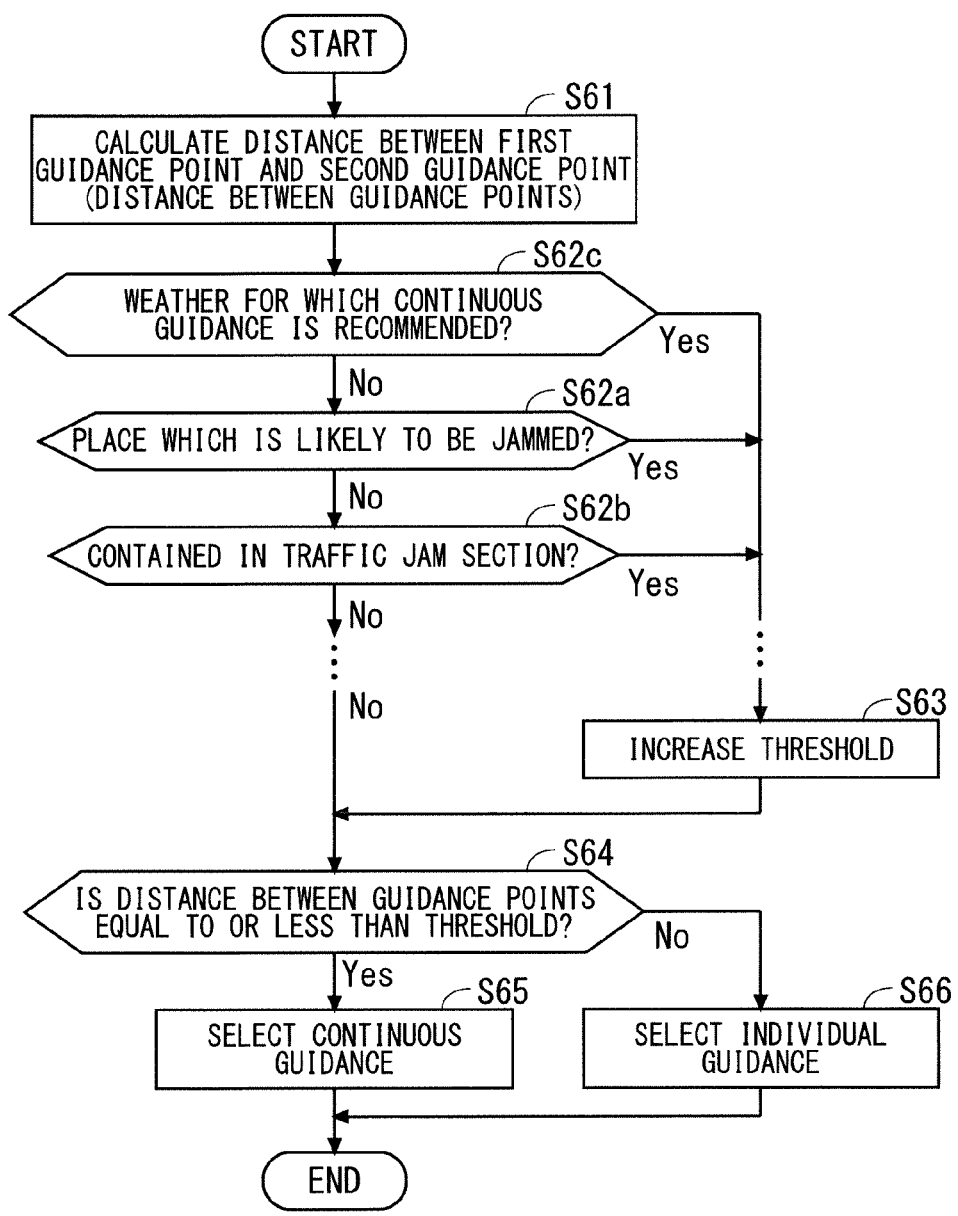
FIG. 10 is a flowchart of a modification of the continuous guidance determination process in the fourth embodiment.

Although FIG. 9 shows an example where the continuous guidance is caused to be easily performed if all of the plurality of items which influence a necessity for the continuous guidance are satisfied (where the so-called "AND conditions" are met), it is possible to cause the continuous guidance to be easily performed if any one of the items is satisfied (where the so-called "OR condition" is met) as in the flowchart of FIG. 10. The case of FIG. 9 has a higher effect in suppressing redundant continuous guidance, and the case of FIG. 10 has a higher effect in helping smooth driving by the continuous guidance.

<Fifth Embodiment>

The above-described first to fourth embodiments may be combined with each other. For example, the first embodiment and the third embodiment may be combined so that the determination of whether or not to perform the continuous guidance is made based on three items, i.e., the distance between guidance points, the current date and time, and the weather information, or the second and fourth embodiments may be further applied so that the road attribute information and the traffic information are added to the consideration.

The fifth embodiment shows an example of a case where all of the above-described first to fourth embodiments are combined. That is, this embodiment proposes a navigation apparatus which determines whether or not to perform the continuous guidance by taking into account the distance between guidance points, the current date and time, the weather information, the road attribute information, and the traffic information.

A configuration and basic operation of the navigation apparatus according to the fifth embodiment may be the same as those of the first embodiment (FIG. 1, FIG. 2, and FIG. 4). Therefore, only the continuous guidance determination process according to the fifth embodiment (corresponding to step. S6 of FIG. 4) will be described here.

Figure 11:
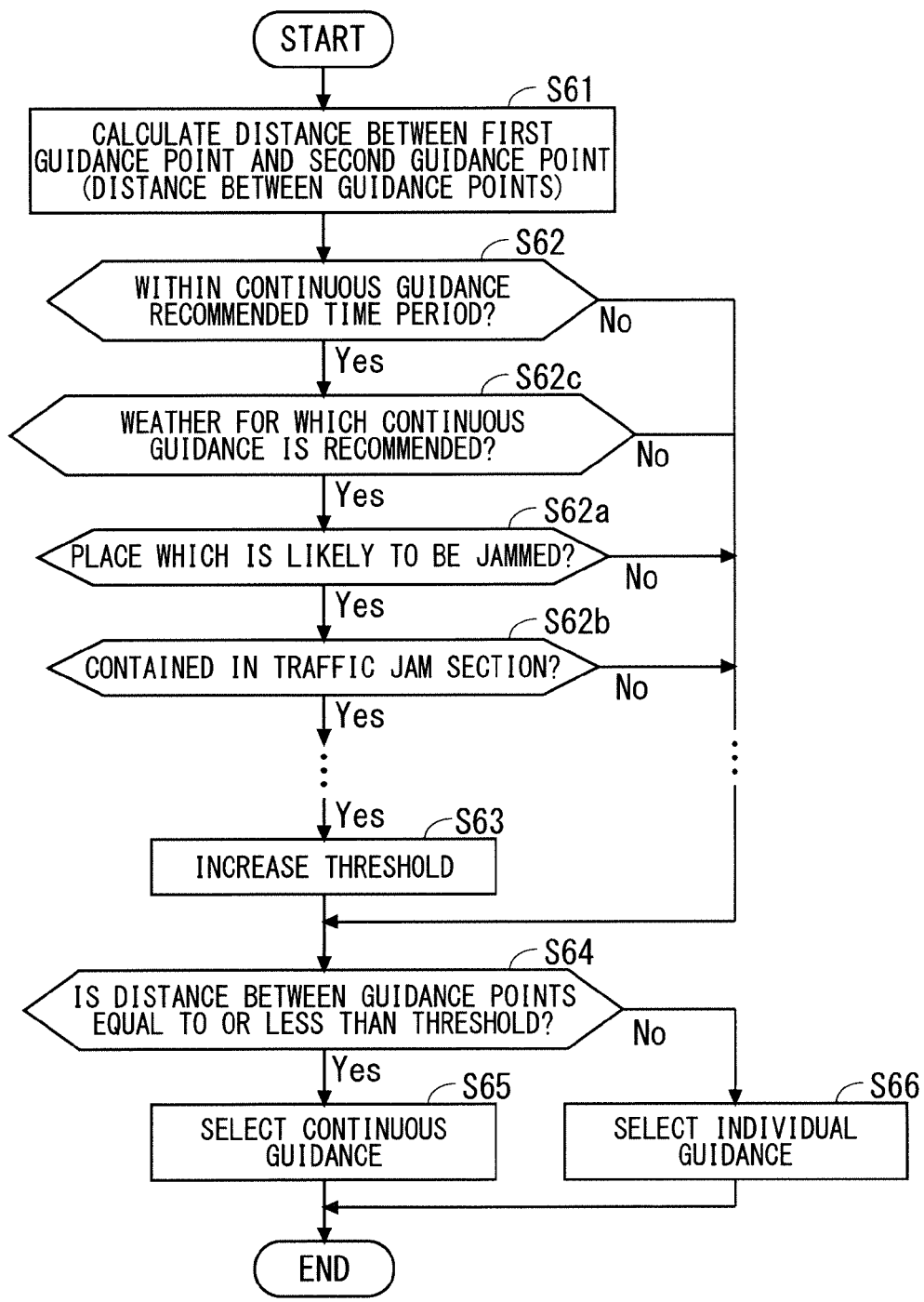
FIG. 11 is a flowchart of a continuous guidance determination process in a fifth embodiment.

FIG. 11 is a flowchart showing an example of the continuous guidance determination process according to the fifth embodiment. In the figure, the same steps as those shown in FIG. 5 to FIG. 10 are denoted by the same reference numerals.

In the continuous guidance determination process of this embodiment, the distance between guidance points which is a distance between the first guidance point and the second guidance point is calculated (step S61), and then, a plurality of items which influence a necessity for the continuous guidance including whether or not the current date and time is within the continuous guidance recommended time period (step S62), whether or not the current weather is the weather for which the continuous guidance is recommended (bad weather) (step S62c), whether or not the area around the first guidance point and the second guidance point is a place which is likely to be jammed with vehicles (step S62a), and whether or not the area around the first guidance point and the second guidance point is contained in a traffic jam section (step S62b) are determined.

If any of the items is not satisfied (No is selected in any of steps S62, S62c, S62a, and S62b), the distance between guidance points obtained in step S61 is compared with the predetermined threshold (step S64). If the distance between guidance points is equal to or less than the threshold, the continuous guidance is selected (step S65), and if not, the individual guidance is selected (step S66).

On the other hand, if all of the items are satisfied (Yes is selected in all of steps S62, S62c, S62a, and S62b), the threshold is corrected to be greater (or the distance between guidance points is corrected to be shorter) so that the continuous guidance is easily performed (step S63), and then, the distance between guidance points is compared with the corrected threshold (step S64). Also in this case, if the distance between guidance points is equal to or less than the threshold, the continuous guidance is selected (step S65), and if not, the individual guidance is selected (step S66).

According to this embodiment, more detailed setting for determining whether or not to perform the continuous guidance is available than in the first to fourth embodiments.

Figure 12:
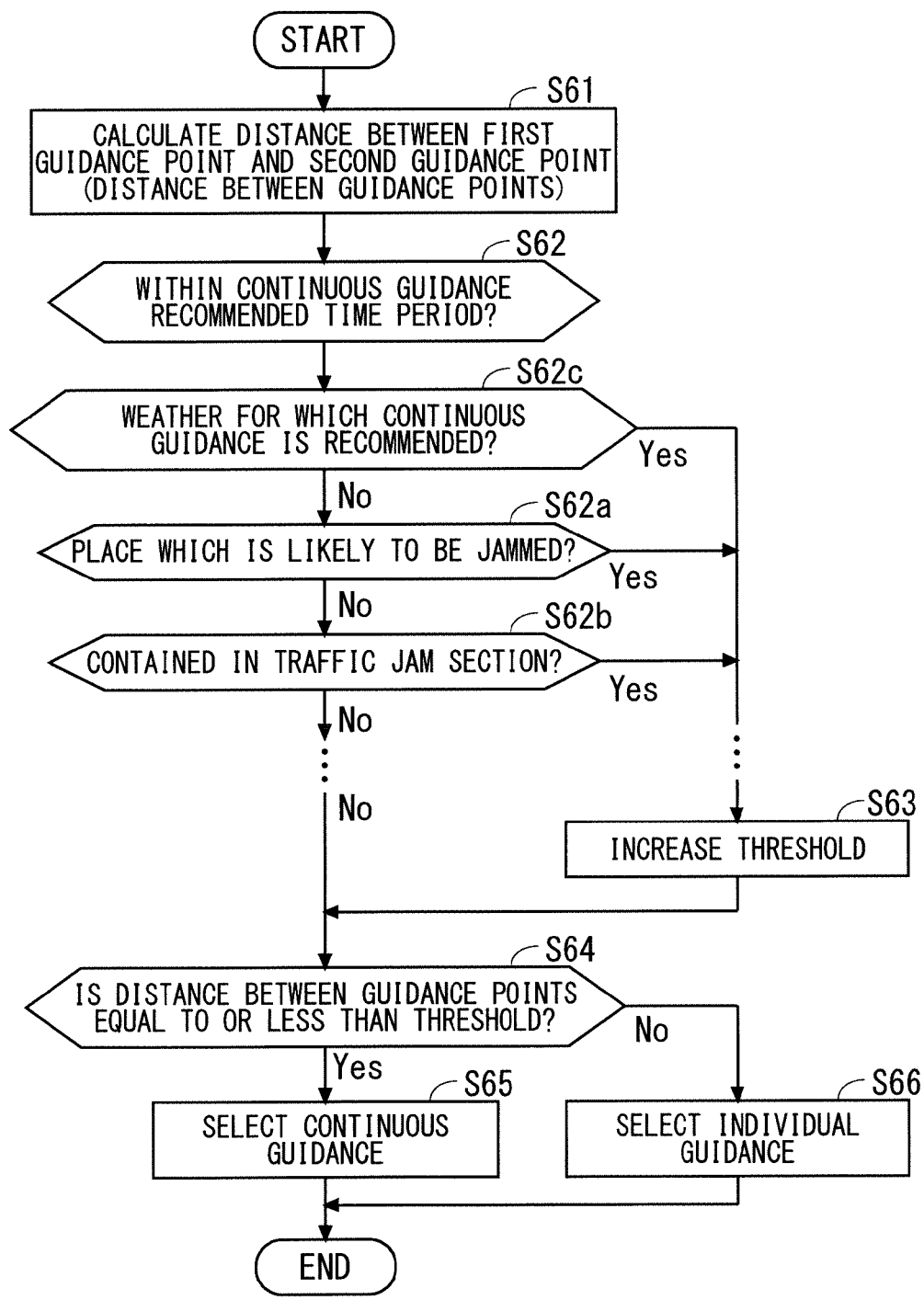
FIG. 12 is a flowchart of a modification of the continuous guidance determination process in the fifth embodiment.

Although FIG. 11 shows an example where the continuous guidance is caused to be easily performed if all of the plurality of items which influence a necessity for the continuous guidance are satisfied (where the so-called "AND conditions" are met), it is possible to cause the continuous guidance to be easily performed if any one of the items is satisfied (where the so-called "OR condition" is met) as in the flowchart of FIG. 12. The case of FIG. 11 has a higher effect in suppressing redundant continuous guidance, and the case of FIG. 12 has a higher effect in helping smooth driving by the continuous guidance.

In the present invention, the respective embodiments can be freely combined, or the respective embodiments can be modified or omitted as appropriate within the scope of the present invention.

Although the present invention has been described in detail, the above descriptions are examples in all aspects, and the present invention is not limited thereto. It is understood that numerous modifications which have not been exemplified can be devised without departing from the scope of the invention.

REFERENCE SIGNS LIST 10 control part
11 map information storage part
12 current position detection part
13 route search part
14 route storage part
15 communication information reception part
16 communication information determination part
17 current date and time acquisition part
18 continuous guidance determination part
19 display part
20 audio message generation part
21 audio guidance part
51 storage 52 GPS receiver
53 direction sensor
54 distance sensor
55 information and communications equipment
56 display
57 audio output device
58 input device
59 control unit
60 CPU
61 ROM
62 RAM
63 display controller
64 I/O unit
P current position
R route to destination
G1 first guidance point
G2 second guidance point
S distance between guidance points

The invention claimed is:

1. A navigation apparatus comprising:
a map information storage that stores map data;
a position detector that detects a current position;
a processor configured to execute a program; and
a memory that stores the program which, when executed by said processor, results in performance of the steps comprising:
setting a route to a destination on said map data;
acquiring current time;
performing guidance along the set route before each guidance point on the route; and
determining, based on a distance between a first guidance point which is a guidance point subsequent to the current position and a second guidance point which is a guidance point subsequent to the first guidance point and the current time, whether to perform continuous guidance in which guidance on said first guidance point and guidance on said second guidance point are continuously performed at one time;
wherein at least one of the distance between said first guidance point and said second guidance point and a threshold according to the current time is corrected, the distance between said first guidance point and said second guidance point is compared with the threshold after the correction, and when the distance between said first guidance point and said second guidance point is equal to or less than said threshold, the continuous guidance is performed.

2. The navigation apparatus according to claim 1, wherein said predetermined time period is one or more of morning hours, evening hours, and night hours.

3. The navigation apparatus according to claim 2, wherein each range of said morning hours, said evening hours, and said night hours is changed in accordance with a season.

4. The navigation apparatus according to claim 2, wherein each range of said morning hours and said evening hours is changed in accordance with whether it is a business day or a nonbusiness day.

5. The navigation apparatus according to claim 1, wherein whether to perform the continuous guidance is determined further based on traffic information of any of said first guidance point, said second guidance point, and a route between said first guidance point and said second guidance point.

6. A navigation apparatus comprising:
a map information storage that stores map data;
a position detector that detects a current position;
a processor configured to execute a program; and
a memory that stores the program which, when executed by said processor, results in performance of the steps comprising:
setting a route to a destination on said map data;
acquiring weather information;
performing guidance along the set route before each guidance point on the route; and
determining, based on a distance between a first guidance point which is a guidance point subsequent to the current position and a second guidance point which is a guidance point subsequent to the first guidance point and said weather information, whether to perform continuous guidance in which guidance on said first guidance point and guidance on said second guidance point are continuously performed at one time;
wherein at least one of the distance between said first guidance point and said second guidance point and a threshold according to said weather information is corrected, the distance between said first guidance point and said second guidance point is compared with the threshold after the correction, and when the distance between said first guidance point and said second guidance point is equal to or less than said threshold, the continuous guidance is performed.

7. The navigation apparatus according to claim 6, wherein whether to perform the continuous guidance is determined further based on traffic information of any of said first guidance point, said second guidance point, and a route between said first guidance point and said second guidance point.

8. The navigation apparatus according to claim 6, wherein said weather information is acquired by a rain sensor of a vehicle equipped with the navigation apparatus.

9. A navigation apparatus installed in a vehicle, the apparatus comprising:
a map information storage that stores map data;
a position detector that detects a current position;
a processor configured to execute a program; and
a memory that stores the program which, when executed by said processor, results in performance of the steps comprising:
setting a route to a destination on said map data;
performing guidance along the set route before each guidance point on the route; and
determining, based on a distance between a first guidance point which is a guidance point subsequent to the current position and a second guidance point which is a guidance point subsequent to the first guidance point and any one or more of a detection result from an illuminance sensor of said vehicle, a usage state of headlights of said vehicle, and a usage state of windshield wipers of said vehicle, whether to perform continuous guidance in which guidance on said first guidance point and guidance on said second guidance point are continuously performed at one time,
wherein at least one of the distance between said first guidance point and said second guidance point and a threshold according to the any one or more of said detection result from said illuminance sensor of said vehicle, said usage state of headlights of said vehicle, and said usage state of windshield wipers of said vehicle is corrected, the distance between said first guidance point and said second guidance point is compared with the threshold after the correction, and when the distance between said first guidance point and said second guidance point is equal to or less than said threshold, the continuous guidance is performed.

* * * * *